(12) United States Patent
Sun et al.

(10) Patent No.: US 12,224,937 B2
(45) Date of Patent: Feb. 11, 2025

(54) NETWORK ROUTING METHOD AND APPARATUS

(71) Applicant: HUAWEI TECHNOLOGIES CO., LTD., Shenzhen (CN)

(72) Inventors: Fengxin Sun, Shenzhen (CN); Guanhua Zhuang, Nanjing (CN); Shuheng Gu, Nanjing (CN); Lijuan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 469 days.

(21) Appl. No.: 17/549,183

(22) Filed: Dec. 13, 2021

(65) Prior Publication Data

US 2022/0103476 A1    Mar. 31, 2022

Related U.S. Application Data

(63) Continuation of application No. PCT/CN2020/096175, filed on Jun. 15, 2020.

(30) Foreign Application Priority Data

Jun. 14, 2019   (CN) .......................... 201910518094.4

(51) Int. Cl.
*H04L 45/745*    (2022.01)
*H04L 45/021*    (2022.01)

(52) U.S. Cl.
CPC .......... *H04L 45/745* (2013.01); *H04L 45/021* (2013.01)

(58) Field of Classification Search
CPC ..... H04L 45/745; H04L 45/021; H04L 45/02; H04L 45/04; H04L 45/306; H04L 45/50;
(Continued)

(56) References Cited

U.S. PATENT DOCUMENTS

| 7,042,870 B1 | 5/2006 | Albert et al. |
| 7,784,055 B2 | 8/2010 | Srivastava |

(Continued)

FOREIGN PATENT DOCUMENTS

| CN | 106489256 A | 3/2017 |
| CN | 106664251 A | 5/2017 |

(Continued)

OTHER PUBLICATIONS

International Search Report issued in corresponding International Application No. PCT/CN2020/096175, dated Aug. 27, 2020, pp. 1-9.

(Continued)

*Primary Examiner* — Donald L Mills
(74) *Attorney, Agent, or Firm* — HAUPTMAN HAM, LLP

(57) ABSTRACT

A method includes receiving, by a network node, a first data packet from a client, wherein the first data packet includes an identifier of a service. The method further includes obtaining, by the network node, flow affinity attribute information of the service based on the identifier of the service, wherein the flow affinity attribute information of the service includes a flow affinity type of the service and a flow affinity timeout time of the service. The method further includes establishing, by the network node, a flow entry based on the flow affinity attribute information of the service in response to the first data packet being a $1^{st}$ data packet in a data flow, wherein the flow entry is useable to forward a subsequent data packet in the data flow.

20 Claims, 12 Drawing Sheets

(58) Field of Classification Search
CPC ..... H04L 45/38; H04L 45/70; H04L 47/2483; H04L 67/1008; H04L 45/44; H04L 47/24; H04L 67/63

See application file for complete search history.

(56) References Cited

U.S. PATENT DOCUMENTS

| | | | |
|---|---|---|---|
| 9,363,183 | B2 | 6/2016 | Kumar et al. |
| 9,455,908 | B2 | 9/2016 | Fernando et al. |
| 2002/0193965 | A1 | 12/2002 | Lablanc et al. |
| 2006/0130064 | A1 | 6/2006 | Srivastava |
| 2015/0124815 | A1* | 5/2015 | Beliveau ............... H04L 45/38 370/392 |
| 2015/0215183 | A1* | 7/2015 | Bucci ................... H04L 47/11 370/252 |
| 2016/0006654 | A1* | 1/2016 | Fernando ............... H04L 45/74 370/392 |
| 2018/0375758 | A1* | 12/2018 | Lorenz ............... H04L 67/1006 |

FOREIGN PATENT DOCUMENTS

| | | |
|---|---|---|
| CN | 108134828 A | 6/2018 |
| EP | 3066802 A1 | 9/2016 |
| WO | 2015063618 A1 | 5/2015 |

OTHER PUBLICATIONS

Chinese Office Action issued in corresponding Chinese Application No. 201910518094.4, dated Mar. 30, 2021, pp. 1-6.

Wion Adrien et al: "Let there be Chaining: How to Augment your IGP to Chain your Services" 2019 IFIP Networking Conference (IFIPNETWORKING) IFIP, May 20, 2019 (May 20, 2019), pp. 1-9, XP033609588.

Extended European Search Report issued in corresponding European Application No. 20822347.9, dated Jun. 20, 2022, pp. 1-11.

* cited by examiner

Value of "whether paths are the same (same_path)" = True (true)

Network node          Network node

NETWORK ROUTING METHOD AND APPARATUS

CROSS-REFERENCE TO RELATED APPLICATIONS

This application is a continuation of International Application No. PCT/CN2020/096175, filed on Jun. 15, 2020, which claims priority to Chinese Patent Application No. 201910518094.4, filed on Jun. 14, 2019. The disclosures of the aforementioned applications are hereby incorporated by reference in their entireties.

TECHNICAL FIELD

Embodiments of this application relate to the field of communications technologies, and in particular, to a network routing method and apparatus.

BACKGROUND

As a large quantity of various cloud computing resources are deployed in a network, a same service is usually deployed on a plurality of service nodes at the same time. Because same services of a plurality of service nodes can provide a same service, the services are equivalent in terms of functions. In this case, an anycast technology is proposed. A plurality of service nodes in the network that provide a same service may be externally identified by using a same service address. When accessing a service, a client does not care about a specific service node on which a requested service is executed. The client only needs to provide a service address of an access request for the network. After receiving the service address sent by the client, the network can route the access request to any service node that can provide the service.

Generally, a data packet of the client may arrive at the service node via one or more network nodes (for example, a switch or a router), and a data packet returned by the service node also arrives at the client via one or more network nodes. A transmission path of the network node through which the data packet of the client passes may be referred to as an upstream path, and a transmission path of the network node through which the data packet returned by the service node passes may be referred to as a downstream path. A process of transmitting a data packet through the upstream path and the downstream path may be referred to as a flow. In some application scenarios, service flows of the client need to be kept on a same service node. Therefore, flow affinity (flow affinity) needs to be maintained when the client accesses flows of a same service. The flow affinity means that data packets need to pass through a same transmission path of network nodes.

When the anycast technology is applied to the network, the network may route data packets of a same user to different service nodes, or may route the data packets to a same service node through different paths. This makes it difficult to maintain flow affinity. For example, in an application scenario such as a metropolitan area network or multi-access edge computing (multi-access edge computing, MEC), especially when a network or computation changes, it is difficult to maintain flow affinity by using the anycast technology. If the flow affinity cannot be maintained, problems such as service interruption, a packet loss, or traffic scattering may occur.

SUMMARY

Embodiments of this application provide a network routing method and apparatus, to resolve a problem of a flow disconnection, a packet loss, or traffic scattering that is caused because flow affinity cannot be maintained in a network routing process.

Specific technical solutions provided in the embodiments of this application are as follows.

According to a first aspect, a network routing method is provided. A network node receives a data packet from a client, where the data packet is denoted as a first data packet, and the first data packet includes an identifier of a service; the network node obtains flow affinity attribute information of the service based on the identifier of the service, where the flow affinity attribute information of the service includes a flow affinity type of the service and flow affinity timeout time of the service, and the flow affinity type is used to identify one or more data items in the first data packet as key values to identify a data flow to which the first data packet belongs; and the network node establishes a flow entry based on the flow affinity attribute information of the service when the first data packet is the $1^{st}$ data packet in the data flow, where the flow entry is used to forward a subsequent data packet in the data flow. The flow entry is established based on the flow affinity attribute information to forward the subsequent data packet based on the flow entry, so that a flow affinity requirement of the service is met. In the method provided in this application, a requirement of a user that a same service node is required to access a same service can be met, to meet a request of the user, and avoid a problem of a flow disconnection, a packet loss, or traffic scattering that is caused because flow affinity cannot be maintained.

In a possible design, the network node determines, based on the identifier of the service, information about a next-hop network node to which the first data packet is routed, where the flow entry further includes the information about the next-hop network node, so that a subsequent data packet is forwarded based on the same information about the next-hop network node, to ensure flow affinity of the data flow.

In a possible design, the network node receives a second data packet from the client, where the second data packet includes the identifier of the service; the network node obtains the flow affinity attribute information of the service based on the identifier of the service; the network node determines one or more flow tables corresponding to the flow affinity type of the service, where there is a correspondence between the flow affinity type of the service and the one or more flow tables; and if the network node determines that the one or more flow tables include the flow entry corresponding to the data flow, the network node forwards the second data packet based on the flow entry. Different flow affinity types correspond to different flow tables, so that it is convenient for the network node to quickly find a flow table set based on flow affinity types corresponding to data packets, and more quickly find, in the flow table set, a flow table corresponding to a data flow to which the data packet belongs. In this way, forwarding efficiency is improved.

In a possible design, the network node determines one or more flow tables corresponding to the flow affinity type of the service, where there is a correspondence between the flow affinity type of the service and the one or more flow tables; and if the network node determines that the one or more flow tables do not include the flow entry corresponding to the data flow, the network node determines that the first data packet is the $1^{st}$ data packet in the data flow. When the $1^{st}$ packet arrives, establishment of the flow entry is triggered, to ensure that a data packet after the $1^{st}$ packet can be forwarded based on the flow entry.

In a possible design, the network node sends a query message to a management node, where the query message is used to query the flow affinity attribute information of the service; and the network node receives an acknowledgement message of the query message from the management node, where the acknowledgement message carries the flow affinity attribute information of the service. A service exposes a flow affinity feature of the service to a network management node as required, and the network node diffuses the flow affinity attribute information based on a service requirement, to implement efficient matching and dynamic adjustment of the service requirement.

In a possible design, the network node receives a notification message from the management node or another network node, where the notification message carries flow affinity attribute information of one or more services; and the network node stores the flow affinity attribute information of the one or more services, where the one or more services include the service indicated by the identifier that is of the service and that is in the first data packet. A service exposes a flow affinity feature of the service to a network management node as required, and the network node diffuses the flow affinity attribute information based on a service requirement, to implement efficient matching and dynamic adjustment of the service requirement.

In a possible design, the network node determines, based on the notification message, that the flow affinity attribute information of the service is changed; and the network node updates, based on changed attribute information, a flow entry that is of the service and that is in the flow table. When the service or the user has a real-time changing requirement for flow affinity, real-time adjustment may alternatively be performed by using a flow entry generated based on flow affinity data, to meet requirements of various services for flow affinity.

In a possible design, the network node deletes the flow entry if the network device determines that timing time in the flow entry exceeds the flow affinity timeout time. When the service or the user has a real-time changing requirement for flow affinity, real-time adjustment may alternatively be performed by using a flow entry generated based on flow affinity data, to meet requirements of various services for flow affinity.

In a possible design, the network node deletes the flow entry if the network node determines that a route of the data flow has failed. When the service or the user has a real-time changing requirement for flow affinity, real-time adjustment may alternatively be performed by using a flow entry generated based on flow affinity data, to meet requirements of various services for flow affinity.

In a possible design, the flow entry further includes one or more of the following information: the identifier of the service, a source internet protocol (IP) address, a source port, a destination IP address, a destination port, and the information about the next-hop network node.

In a possible design, a value of the flow affinity type includes one of or any combination of the following: a transmission protocol type, the source IP address, the source port, the destination IP address, and the destination port.

In a possible design, a value of the flow affinity type includes network layer flow affinity and transport layer affinity, a value of the network layer flow affinity includes the source IP address and the destination IP address, and a value of the transport layer flow affinity includes a transport layer protocol type, the source IP address, the source port, the destination IP address, and the destination port.

In a possible design, the flow affinity attribute information of the service further includes one or more of the following: indication information indicating whether an upstream transmission path and a downstream transmission path of the data flow need to be consistent; hot swapping function indication information of the data flow, where the hot swapping function indication information of the data flow includes enable indication information; backhaul packet timeout timer time information; data flow caching function indication information; data flow caching cache length information; data flow resetting indication information, where the resetting indication information is used for indicating whether the network node monitors a first flag bit of the data packet, reselecting, based on a monitoring result, a service node that receives the data flow, and updating the flow entry; and data flow deletion indication information, where the deletion indication information is used for indicating whether the network node monitors a second flag bit of the data packet, and deleting the flow entry of the data flow based on a monitoring result. When the service or the user has a real-time changing requirement for flow affinity, real-time adjustment may alternatively be performed by using a flow entry generated based on flow affinity data, to meet requirements of various services for flow affinity.

According to a second aspect, a network routing apparatus is provided. The apparatus has a function of implementing any one of the first aspect and the possible designs of the first aspect. The function may be implemented by hardware, or may be implemented by hardware by executing corresponding software. The hardware or the software includes one or more modules corresponding to the foregoing function.

In a possible design, the apparatus may be a chip or an integrated circuit.

In a possible design, the apparatus includes a transceiver and a processor. The transceiver is configured to communicate with another communications device. The processor is configured to be coupled to the memory to execute a program stored in the memory. When the program is executed, the apparatus may perform the method in any one of the first aspect and the possible designs of the first aspect.

In a possible design, the apparatus further includes a memory, and the memory stores the program executed by the processor.

In a possible design, the apparatus is a network node, a switch, or a router.

According to a third aspect, a chip is provided. The chip is connected to a memory or the chip includes a memory, and is configured to read and execute a software program stored in the memory, to implement the method in any one of the first aspect and the possible designs of the first aspect.

According to a fourth aspect, a communications system is provided, where the communications system includes a client, a network node, and a service node, and the network node is configured to perform the method in the first aspect and any possible design.

According to a fifth aspect, a computer-readable storage medium is provided, where the computer-readable storage medium stores instructions, and when the instructions are run on a computer, the computer is enabled to perform the method in any one of the first aspect and the possible designs of the first aspect.

According to a sixth aspect, a computer program product that includes instructions is provided. When the computer program product is run on a computer, the computer is enabled to perform the method in any one of the first aspect and the possible designs of the first aspect.

DESCRIPTION OF EMBODIMENTS

The following describes in detail the embodiments of this application with reference to the accompanying drawings.

Embodiments of this application provide a network routing method and apparatus, to maintain flow affinity in a network routing process. The method and the apparatus are based on a same concept. Because principles for resolving a problem by using the method and the apparatus are similar, mutual reference may be made between implementations of the apparatus and the method, and repeated descriptions are omitted. In descriptions of the embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this application, "at least one" means one or more, and "a plurality of" means two or more. In addition, it should be understood that in descriptions of this application, terms such as "first" and "second" are merely used for differentiation and description, but should not be understood as an indication or implication of relative importance or an indication or implication of an order.

Figure 1:
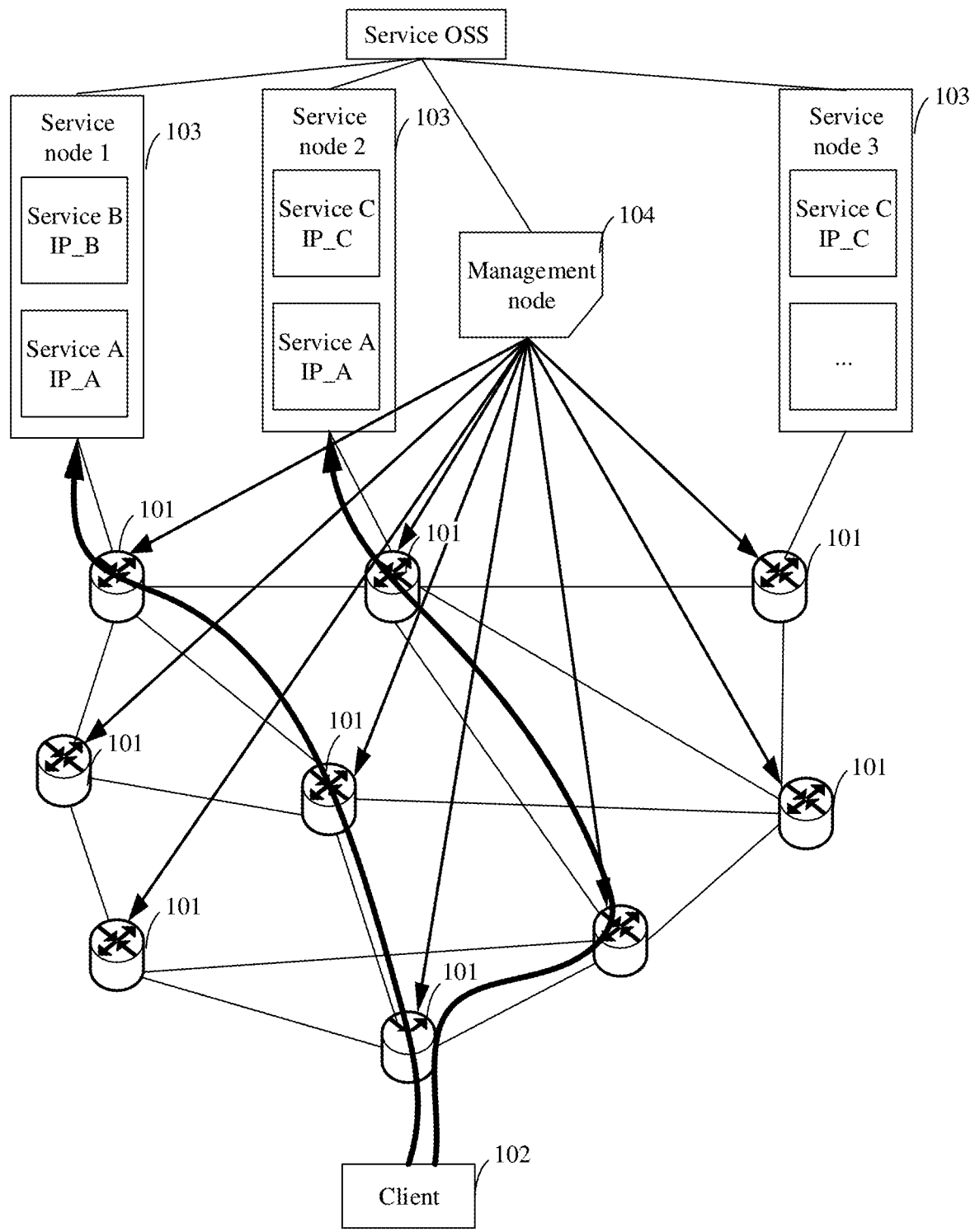
FIG. 1 is a schematic diagram of an architecture of a communications system according to an embodiment of this application.

FIG. 1 is a schematic diagram of an architecture of a possible network system to which a network routing method is applicable according to an embodiment of this application. As shown in FIG. 1, a network system 100 includes a network node 101, a client 102, and a service node 103. The system 100 may further include a service management node 104. There may be one or more network nodes 101 and one or more service nodes 103.

The client 102 is configured to: request the service node 103 to provide a service, send a request packet or a data flow to the service node 103 through the network node 101, and receive the service from the service node 103.

The network node 101 is configured to: obtain a flow affinity attribute of the service from the service management node 104, locally store the flow affinity attribute of the service, and when the request packet or the data flow sent by the client 102 is received, establish a flow entry based on the flow affinity attribute, to forward the request packet or the data flow and maintain flow affinity of the service. The network node 101 may be a routing device such as a switch or a router.

The service node 103 is configured to provide a service for the client 102. A same service may exist on a plurality of service nodes 103. For example, an anycast technology is applied to a network, and a plurality of service nodes in the network that provide a same service may be externally identified by using a same service address. In this case, the client 102 only needs to provide a service address that is requested to access. The client 102 does not care about a specific service node 103 to which the network device 101 routes the data flow to provide a service. One or more service instances may be run on the service node 103, and different service instances provide services of different functions.

The service management node 104 manages a service instance that is run on each service node, and manages a flow affinity attribute of each service. The service management node 104 may provide the flow affinity attribute of each service for each network node 101. The service management node 104 may provide the flow affinity attribute of each service for each network node 101 through a control module. The control module may be a hardware or software module on the service management node 104, for example, a component or an interface. The service management node 104 may be a network management system, for example, an operation support system (operation support system, OSS).

In this application, the service management node 104 and each network node 101 form a control plane. The client 102, each network node 101, and the service node 103 form a data plane. The control plane is formed by using a link (a thin-line arrow in FIG. 1) between the management node 104 and each network node 101, and is used to transmit flow affinity attribute information of the service. The data plane is formed by the client by using a link (a bold-line arrow in FIG. 1) between each network node 101 and the service node 103. FIG. 1 is described by using an example in which the client separately reaches a service node 1 and a service node 2 through two paths.

In FIG. 1, the service node 1, the service node 2, and a service node 3 are used as examples of the service node 103. A service A and a service B are run on the service node 1, the service A and a service C are run on the service node 2, and the service C is run on the service node 3. An address exposed externally by the service A is IP_A, an address exposed externally by the service B is IP_B, and an address exposed externally by the service C is IP_C. In this way, when the client is to access the service A, the service A may be provided by the service node 1, the service node 2, or another node that runs the service A.

This embodiment of this application may be, without being limited to, applied to an application scenario such as a metropolitan area network, mobile edge computing (mobile edge computing, MEC), or multi-access edge computing (multi-access edge computing, MEC).

When the anycast technology is applied to the network, if the network node 104 performs forwarding according to an existing forwarding technology, data packets in data flows from a same client (or user) may be routed to different service nodes because different service nodes may provide a same service. However, some clients require that a same transmission path and a same service node be maintained to access flows of a same service, in other words, maintain flow affinity. To resolve this problem, an embodiment of this application provides a network routing method. The network routing method provided in this embodiment of this application is described in detail below.

A basic idea of this embodiment of this application is that a network node locally establishes a flow entry, and forwards an incoming data packet based on a flow affinity attribute in the flow entry, to ensure that flow affinity is maintained when a same client accesses flows of a same service.

Figure 2:
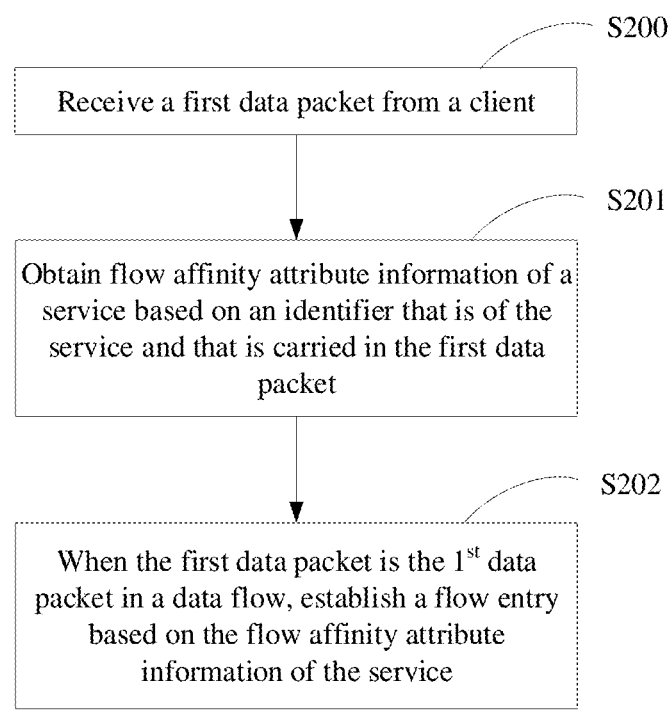
FIG. 2 is a schematic flowchart 1 of a network routing method according to an embodiment of this application.

As shown in FIG. 2, a detailed process of the network routing method provided in this embodiment of this application is described as follows.

S200: A client sends a data packet to a network node, and the network node receives the data packet from the client.

The data packet herein is denoted as a first data packet, and the first data packet includes an identifier of a service. The service is a service that the client is to access.

S201: The network node obtains flow affinity attribute information of the service based on the identifier that is of the service and that is carried in the first data packet.

In this application, the flow affinity attribute information includes a flow affinity type and flow affinity timeout time. The flow affinity type is used to identify a data item that is in a data packet and that is used as a key value (KEY)/keyword to distinguish different data flows. In other words, the flow affinity type is used to identify a data item that is in the data packet and that is used as a key value to identify a data flow to which the data packet belongs. The first data packet is used as an example. The flow affinity type that is of the service and that is obtained by the network node is used to identify one or more data items in the first data packet as one or more key values to identify a data flow to which the first data packet belongs. A value of the flow affinity type includes key values used to distinguish between flows. The key value/keyword herein may be any one of or a combination of a plurality of members in an internet protocol (internet protocol, IP) 5-tuple. The IP 5-tuple includes a transmission protocol type, a source IP address, a source port, a destination IP address, and a destination port. For example, the flow affinity type includes network layer flow affinity and transport layer flow affinity. The network layer flow affinity identifies one flow by using two key values, and a value of the network layer flow affinity includes the source IP address and the destination IP address. The transport layer flow affinity identifies one flow by using five key values, and a value of the transport layer flow affinity includes a transport layer protocol type, the source IP address, the source port, the destination IP address, and the destination port. The network layer flow affinity is used to indicate that a service belongs to a network layer, and the client and the service node provide and use the service through the network layer. The transport layer flow affinity is used to indicate that a service belongs to a transport layer, and the client and the service node provide and use the service through the transport layer. The network layer and the transport layer are different layers of a protocol stack.

The network node may locally store different flow affinity attribute information corresponding to different services. In this step, the network node may obtain, based on the identifier of the service, the flow affinity attribute information corresponding to the service. An optional manner in which the network node obtains different flow affinity attribute information corresponding to different services and an optional storage manner are described in the following embodiment shown in FIG. 3.

S202: When the first data packet is the $1^{st}$ data packet in the data flow, the network node establishes a flow entry based on the flow affinity attribute information of the service.

The network node may establish the flow entry based on the flow affinity attribute information of the service. The network node may locally maintain a flow table, the flow table includes one or more flow entries, and one flow entry is used to identify various attribute information of one flow. The flow entry includes the flow affinity attribute information of the service. When the $1^{st}$ data packet in a data flow arrives, the network node inserts a new flow entry into the flow table, and the flow entry is used to forward a subsequent data packet in the data flow. When the network node forwards a data packet in the data flow based on the flow entry, the network node may maintain flow affinity of the data flow based on the flow affinity attribute information of the service.

To implement a function of the flow entry, in addition to the flow affinity attribute information of the service, the flow entry may further include the identifier of the service, a source IP address, a source port, a destination IP address, a destination port, and information about a next-hop network node. The network node performs service addressing or routing based on the identifier of the service, to determine information about a next-hop network node to which the first data packet is routed. The service addressing or routing may be performed in any manner in an existing technology. This is not limited in this application. Whether an incoming subsequent data packet belongs to the data flow is determined based on any one or more of the identifier of the service, the source IP address, the source port, the destination IP address, and the destination port.

After S202, when a subsequent data packet arrives, the following steps may be performed.

The client sends a second data packet to the network node, and the network node receives the second data packet from the client, where the second data packet includes the identifier of the service, and the identifier of the service is the same as the identifier of the service of the first data packet in S200. The network node may determine that the second data packet and the first data packet access a same service. The network node obtains the flow affinity attribute information of the service based on the identifier of the service, and an obtaining method is the same as that in S201. After the flow affinity attribute information of the service is obtained, one or more flow tables corresponding to the flow affinity type of the service are determined based on the flow affinity type that is of the service and that is in the flow affinity attribute information. In actual application, the network node may locally store a correspondence between different flow affinity types and different flow tables. For example, if an identifier of the flow affinity type is 1, a 2-tuple is correspondingly used to distinguish between some flow tables of different flows; or if an identifier of the flow affinity type is 2, a 5-tuple is correspondingly used to distinguish between some flow tables of different flows. The network node performs searching based on the one or more flow tables corresponding to the flow affinity type of the service, to determine whether there is a flow entry corresponding to a data flow to which the second data packet belongs. If there is the flow entry corresponding to the data flow to which the second data packet belongs, the network node forwards the second data packet based on the flow entry. In this way, the second data packet may have a same forwarding path as the first data packet, to maintain flow affinity of the data flow. Based on the foregoing descriptions, in S202, when determining that the one or more flow tables corresponding to the flow affinity type of the service do not include the flow entry corresponding to the data flow to which the first data packet belongs, the network node may determine that the first data packet is the 1$^{st}$ data packet in the data flow, to establish the flow entry of the data flow.

As described above, the service management node 104 manages flow affinity attribute information of each service, and the network node may obtain the flow affinity attribute information of the service in two manners: active obtaining or passive reception.

For example, the network node obtains the flow affinity attribute information of the service in a passive reception manner. The management node sends a notification message to the network node, and the network node receives the notification message from the management node or another network node. The notification message carries the flow affinity attribute information of the service.

For another example, the network node may alternatively obtain the flow affinity attribute information of the service actively. The network node sends a query message to the management node, and the management node returns an acknowledgement message based on the query message to the network node. The acknowledgement message carries the flow affinity attribute information of the service. The network node receives the acknowledgement message from the management node or another network node, and obtains the flow affinity attribute information that is of the service and that is in the acknowledgement message.

Figure 3:
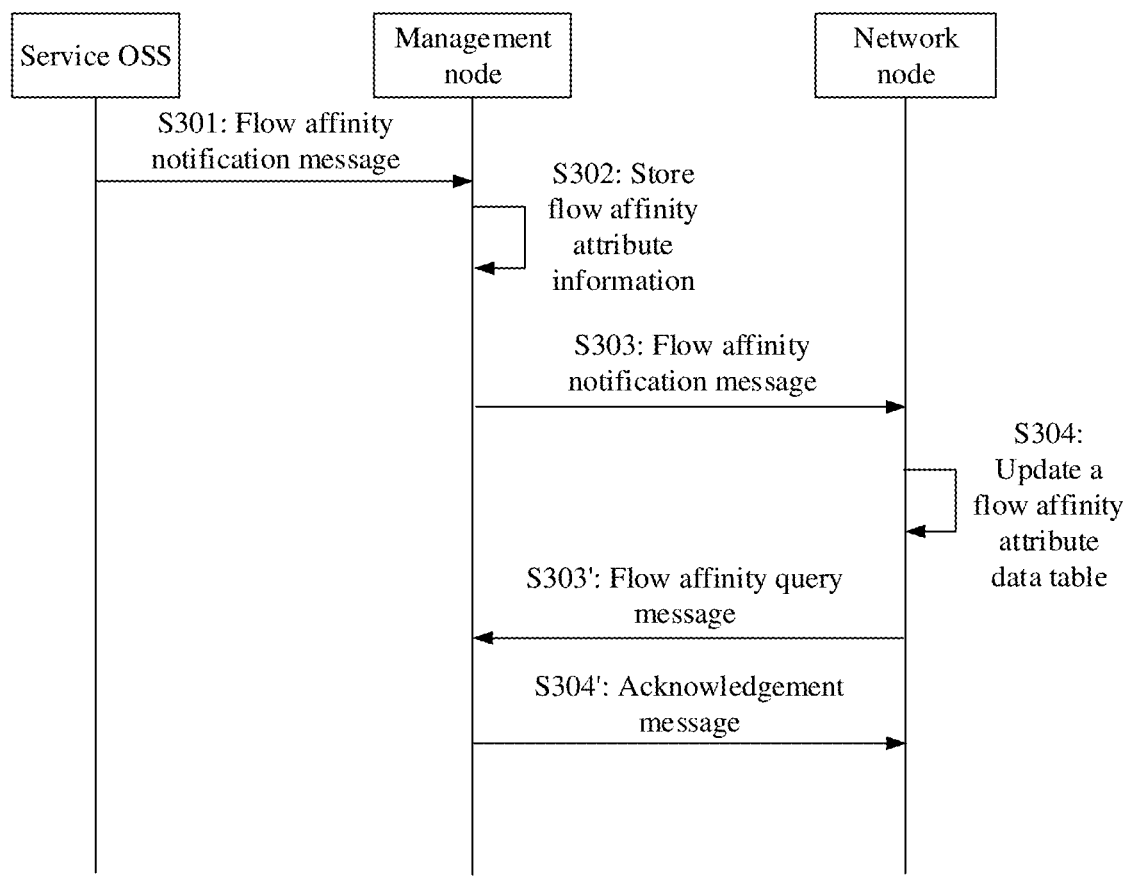
FIG. 3 is a schematic diagram of a process in which a network node obtains flow affinity attribute information of a service according to an embodiment of this application.

As shown in FIG. 3, two possible specific implementations in which the network node obtains the flow affinity attribute information of the service are described as follows.

S301: A service OSS sends a flow affinity notification message to the management node, and the management node receives the flow affinity notification message from the service OSS.

The flow affinity notification message is alternatively referred to as a notification message. When a service accesses or exits a network or the flow affinity attribute information of the service is changed, the service OSS sends the flow affinity notification message to the management node.

S302: After receiving the flow affinity notification message, the management node parses content of the message and stores the flow affinity attribute information of the service.

For example, the management node may locally store and maintain a flow affinity data table. Each item in the flow affinity data table corresponds to flow affinity attribute information of one service.

When the network node passively receives the flow affinity attribute information of the service, S303 and S304 are performed.

S303: The management node sends the flow affinity notification message to each connected network node, and each network node receives the flow affinity notification message from the management node or another network node.

In FIG. 3, one network node is used as an example. In actual application, the network may include a plurality of network nodes. An action performed by the network node is applicable to each network node.

S304: The network node stores the flow affinity attribute information that is of the service and that is in the flow affinity notification message, or updates data of stored flow affinity attribute information based on the received flow affinity notification message.

The network node may locally form a flow affinity data table based on the received flow affinity notification message, or update a locally formed flow affinity data table based on the received flow affinity notification message. For example, if the flow affinity notification message indicates to update or delete the flow affinity attribute information of the service, the network node maintains, to be specific, updates or deletes, a corresponding item in the flow affinity data table based on the flow affinity notification message.

When the network node actively obtains the flow affinity attribute information of the service, S303' and S304' are performed.

S303': The network node sends a query message to the management node, and the management node receives the query message from the network node.

The query message is used to query one or more flow affinity attributes of one or more services.

When the network node starts or is inaccurate in determining a flow affinity status of a specific service, the network node is triggered to send the query message to the management node.

S304': After receiving the query message, the management node returns an acknowledgement message to the network node.

The management node queries whether the flow affinity attribute information of the service is stored locally. If the flow affinity attribute information of the service is stored locally, the acknowledgement message carries the flow affinity attribute information that is of the service and that is queried by the network node.

In this embodiment of this application, the network node locally stores and maintains the flow affinity data table, and each item is flow affinity attribute information of one service. An example of the flow affinity data table is provided below. The example is applicable to the flow affinity data table stored and maintained by the management node.

For example, a possible flow affinity data table is shown in Table 1.

TABLE 1

| Identifier of service | Flow affinity type | Flow affinity timeout time | Additional parameter |
| --- | --- | --- | --- |
| 8.8.8.8 | 1 | 30 s | Parameter 1 |
| 11.0.0.11 | 1 | 20 s | Parameter 2 |
| 12.5.1.10:80 | 2 | 500 ms | Parameter 3 |
| ... | | | |

In the flow affinity data table shown in Table 1, flow affinity attribute information of three services is shown as examples. The flow affinity attribute information includes a flow affinity type and flow affinity timeout time, and may further include other additional parameters. Different services are distinguished by identifiers (IDs) of services. Flow affinity types may be distinguished by different type identifiers. For example, an identifier 1 is used to represent one flow affinity type, and an identifier 2 is used to represent another flow affinity type. Optionally, the identifier 1 indicates network layer flow affinity, and the identifier 2 indicates transport layer flow affinity. As shown in Table 1, a flow affinity type of a service whose identifier is 8.8.8.8 is the network layer flow affinity, and flow affinity timeout time is 30 s; a flow affinity type of a service whose identifier is 11.0.0.11 is the network layer flow affinity, and flow affinity timeout time is 20 s; and a flow affinity type of a service whose identifier is 12.5.1.10:80 is the transport layer flow affinity, and flow affinity timeout time is 500 ms.

The additional parameters in the flow affinity attribute information may include the following several types. Table 2 may be used to show indication information of each additional parameter as an example. The indication information of each additional parameter is represented by data content, a data type, and an interpretation. In this application, the "data flow" may also be referred to as a "flow" for short.

Figure 4:
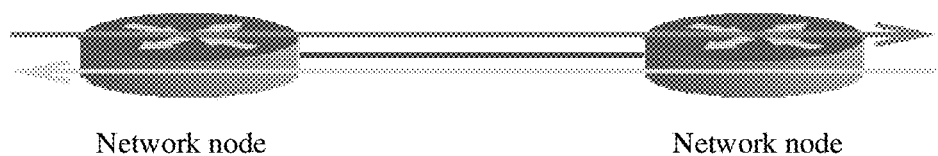
FIG. 4 is a schematic diagram in which an upstream transmission path and a downstream transmission path of a flow are consistent according to an embodiment of this application.

(1) Indication information indicating whether an upstream transmission path and a downstream transmission path of the flow need to be consistent: Data content of this parameter may be represented by using same_path, a data type is bool, and an interpretation of this parameter is whether an upstream path and a downstream path need to be consistent. As shown in FIG. 4, when a value of this parameter is true (true), the upstream transmission path and the downstream transmission path of the flow need to be consistent; in other words, a backhaul packet needs to be returned according to an original path. In this application, the network node establishes a flow entry based on the flow affinity attribute information, and when transmitting an upstream data packet, the network node queries a routing path and a service node based on the flow entry. If a value of same_path in the flow affinity attribute information in the flow entry is true, it indicates that the network node needs to return the backhaul packet according to an original transmission path when transmitting the backhaul packet.

(2) Hot swapping function indication information of the flow includes a hot swapping function (hot_swap_enable) indication information of the flow, for example, data content of this parameter is represented by using hot_swap_enable, a data type is bool, and an interpretation of this parameter is whether hot swapping is supported. When a value of this parameter is true, the hot swapping function of the flow is enabled.

(3) Backhaul packet timeout timer time information: Data content of this parameter may be identified by using hot_swap_timeout, a data type is long, and an interpretation of this parameter may be hot swapping timeout time. When the value of the parameter in (2) is true, the hot swapping function of the flow is enabled. When there is no backhaul packet within backhaul packet timeout time indicated by the parameter in (3), hot swapping of the flow is triggered, that is, switching to a next-hop network node (a target hop) of the flow, so that switching of a service node of the flow is implemented.

(4) Data flow caching function indication information: Data content of this parameter may be indicated by using cache_enable, a data type is bool, and an interpretation of this parameter is whether a data packet needs to cached. When a value of cache_enable is true, it indicates that a data packet of the flow needs to be cached.

(5) Data flow caching cache length information: Data content of this parameter may be identified by using a cache size (cache size), a data type is long, and an interpretation of this parameter is a cache size.

A purpose of caching is to send cached data to a new network node when hot swapping of the flow is triggered.

(6) Data flow resetting indication information: The resetting indication information is used for indicating whether the network node monitors a first flag bit of the data packet, reselecting, based on a monitoring result, a service node that receives the data flow, and updating the flow entry.

Data content of this parameter may be indicated by using active_reset_enable, a data type is bool, and an interpretation of this parameter is whether resetting of the flow entry is supported. When a value of active_reset_enable is true, the network node monitors the first flag bit of the data packet of the flow, for example, the first flag bit is a reset flag of the data packet, and when the reset flag of the data packet is true, the service node is reselected, and a value of the flow affinity timeout time and a value of another additional parameter are reset. The reset flag of the data packet may reuse a reset (reset) flag in a transmission control protocol (transmission control protocol, TCP), or another reset flag may be defined in a layer-3 or layer-4 packet header of a protocol layer.

(7) Data flow deletion indication information: The deletion indication information is used for indicating whether the network node monitors a second flag bit of the data packet, and deleting the flow entry of the data flow based on a monitoring result.

Data content of this parameter may be indicated by using active_del_enable, a data type is bool, and an interpretation of this parameter is whether active deletion of the flow entry is supported. When a value of active_del_enable is true, the network node monitors a flag bit of the data packet in the flow, and when a deletion flag of the data packet is true, deletes the flow entry corresponding to the flow in the flow table. The flag bit reuses a fin flag in the TCP, or another deletion flag may be defined in the layer-3 or layer-4 packet header of the protocol layer.

TABLE 2

| Data content | Data type | Interpretation |
|---|---|---|
| Whether paths are the same (same_path) | bool | Whether an upstream path and a downstream path are required to be consistent |
| Hot swapping function of a flow | bool | Whether hot swapping of the flow is supported |
| Backhaul packet timeout timer time | long | Hot swapping timeout time of the flow |
| Data flow caching function (cache_enable) | bool | Whether a data packet needs to be cached |
| Cache size (cache size) | long | Cache size |
| Data flow resetting | bool | Whether resetting of a flow entry is supported |
| Data flow deletion | bool | Whether deletion of a flow entry is supported |
| ... | | |

The flow affinity attribute information of the service is shown by using examples in Table 1 and Table 2. The network node receives the notification message from the management node or another network node to obtain the flow affinity attribute information of the service, or the network node sends the query message to the management node to obtain the flow affinity attribute information of the service. A format and content of the notification message or the query message (collectively referred to as a flow affinity message for short below) are described below.

A format of the flow affinity message includes two parts: a common message header and a message body (body). The common message header is a common header of various flow affinity messages, and is used to identify a message body type, a message length, and the like. The format is shown in Table 3 below.

TABLE 3

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|----|----|----|----|----|----|----|----|----|----|----|----|----|----|----|----|----|----|----|----|----|
| Version number (version number) | | | | | Reserved (reserved) | | | | | Message type (type) | | | | | | | | | | | Message length (msg len) | | | | | | | | | |
| Message sequence number (sn) | | | | | | | | | | | | | | | | | | | | | | | | | | | | | | |

The message body is content of various flow affinity messages, and is used to transfer flow affinity interaction data of the service, namely, the flow affinity attribute information of the service. A format of the notification message is shown in Table 4. A format of the query message is shown in Table 5.

TABLE 4

| Data content | Data type | Interpretation |
|---|---|---|
| Quantity of service items (service count) | long | Quantity of items in the flow affinity information that is of the service and that is included in the message |
| Service item length (service Item Len (1)) | short | Quantity of items in flow affinity information that is of a service (1) and that is included in the message |
| Type of a service identifier (1) (service ID type (1)) | short | Type (IPv4, IPv6, or the like) of the service (1) |
| Service identifier (1) (service ID (1)) | char[] | Identification number of the service (1) |
| Flow affinity type (flow affinity type(1)) | char | Flow affinity type of the service (1) |
| Flow affinity timeout time (timeout (1)) | long | Flow affinity timeout time of the service (1) |
| Parameter (parameter) | struct | Additional parameter of the service (1) |
| . . . | | |

TABLE 5

| Data content | Data type | Interpretation |
|---|---|---|
| Quantity of service items (service count) | long | Quantity of items in the flow affinity information that is of the service and that is included in the message |
| Type of a service identifier (1) (service ID type (1)) | short | Type (IPv4, IPv6, or the like) of a service (1) |
| Service identifier (1) (service ID (1)) | char[] | Identification number of the service (1) |
| Type of a service identifier (2) (service ID type (1)) | short | Type (IPv4, IPv6, or the like) of a service (2) |
| Service identifier (2) (service ID (1)) | char[] | Identification number of the service (2) |
| . . . | | |

The network node may query flow affinity attribute information of one or more services from a network management node based on a query message of the content format shown in Table 5.

After obtaining flow affinity attribute information of each service, the network node locally establishes a flow table. The flow table includes a plurality of items, namely, flow entries, and each flow entry represents identification information and flow affinity attribute information of one flow.

Table 6 shows an example of a flow table established and maintained by the network node.

TABLE 6

| Service IP | Client IP | Client port | Next-hop network node | Time-stamp | Timer | Whether paths are the same | Hot swapping function of a flow | Backhaul packet timeout timer time | Data flow caching function | Cache size | Data flow resetting | Data flow deletion |
|---|---|---|---|---|---|---|---|---|---|---|---|---|
| Service 2 | 1.2.4.1 | 7632 | Router 2 | 1013 | Timer 4 | NULL | NULL | NULL | NULL | NULL | NULL | NULL |
| | 1.2.4.1 | 37905 | Router 5 | 994 | Timer 5 | FALSE | TRUE | 20 | FALSE | 0 | FALSE | TRUE |
| | 1.2.4.2 | 21236 | Service node 1 | 1027 | Timer 6 | TRUE | TRUE | 10 | TRUE | 200 | TRUE | FALSE |
| . . . | | | | | | | | | | | | |

The network node establishes the flow entry based on the obtained flow affinity attribute information of the service, and maintains the flow table. As shown in Table 6, there is a service IP address of a service (2) in the first column, and the service IP address of the service (2) is a destination address in an upstream process. In upstream transmission, client IP is source IP, and a client port is a source port. The network node obtains information about a next-hop network node (target hop) based on service addressing and routing, and records the information in the flow entry. A timestamp and information about a timer are determined based on the flow affinity timeout time in the flow affinity attribute information. Based on information about the additional parameter in the flow affinity attribute information, information about parameters such as "Whether paths are the same", "Hot swapping function of a flow", "Backhaul packet timeout timer time", "Data flow caching function", "Cache size", "Data flow resetting", and "Data flow deletion" in later few columns. "NULL" indicates null and the additional parameter does not exist. The parameter is enabled only when a value of the additional parameter is "TRUE". The parameter is not enabled when the value is "FALSE".

The timestamp is a time at which the timer starts timing. The flow affinity timeout time may be implemented by using the timer and the timestamp, or an aging (aging) time is recorded in the flow entry. When the aging time decreases to 0, it indicates that the flow affinity timeout time arrives.

The flow table shown in Table 6 forms, by using source IP, destination IP, and a source port, a parameter that identifies a flow, in other words, indicates the flow affinity type.

The network node triggers establishment, update, or deletion of the flow entry in the following several triggering manners.

Figure 5:
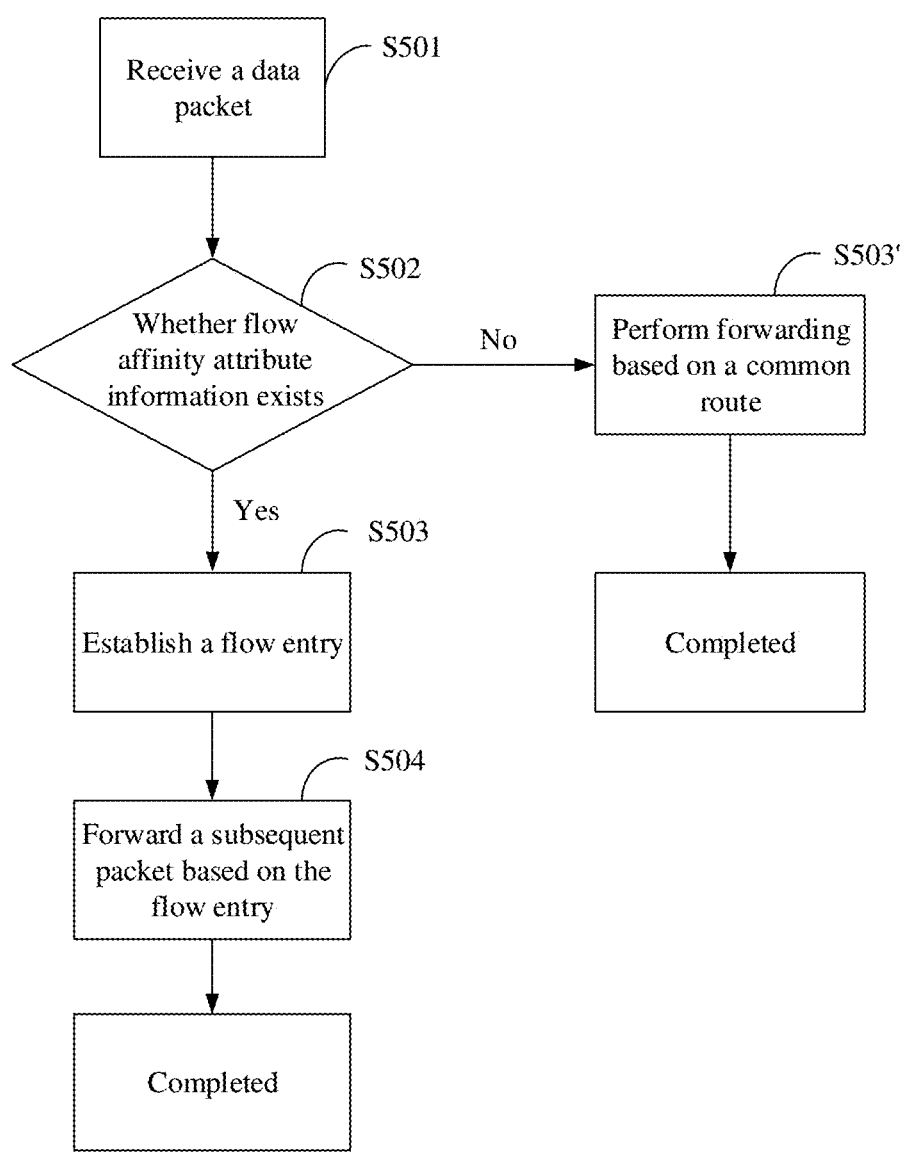
FIG. 5 is a schematic flowchart of triggering establishment of a flow entry according to an embodiment of this application.

In a first manner, when receiving the 1$^{st}$ data packet in a data flow, the network node establishes a flow entry. Details are shown in FIG. 5.

S501: The network node receives a data packet from the client.

The data packet carries an identifier of a service, and the identifier is used to indicate the service to be accessed.

S502: The network node queries a flow affinity data table to determine whether flow affinity attribute information of the service exists, and if the flow affinity attribute information of the service exists, performs S503, or otherwise, performs S503'.

The network node queries, based on the identifier of the service, whether the flow affinity attribute information of the service exists in the flow affinity data table.

S503: Establish a flow entry based on the flow affinity attribute information of the service, insert the flow entry into a flow table, and continue to perform S504.

Before S503, the network node may further determine, based on the identifier of the service, that the flow table does not include a flow entry of a data flow to which the data packet belongs, and then establish the flow entry. If the flow table includes the flow entry of the data flow to which the data packet belongs, it indicates that the data packet is not the 1$^{st}$ data packet, the data packet may be forwarded based on the flow entry.

S503': Forward the data packet according to a path of a common route.

S504: Forward a subsequently received data packet based on the flow entry.

Therefore, it is ensured that packets of a same data flow can be forwarded based on a same flow entry, to reach a same service node.

Figure 6:
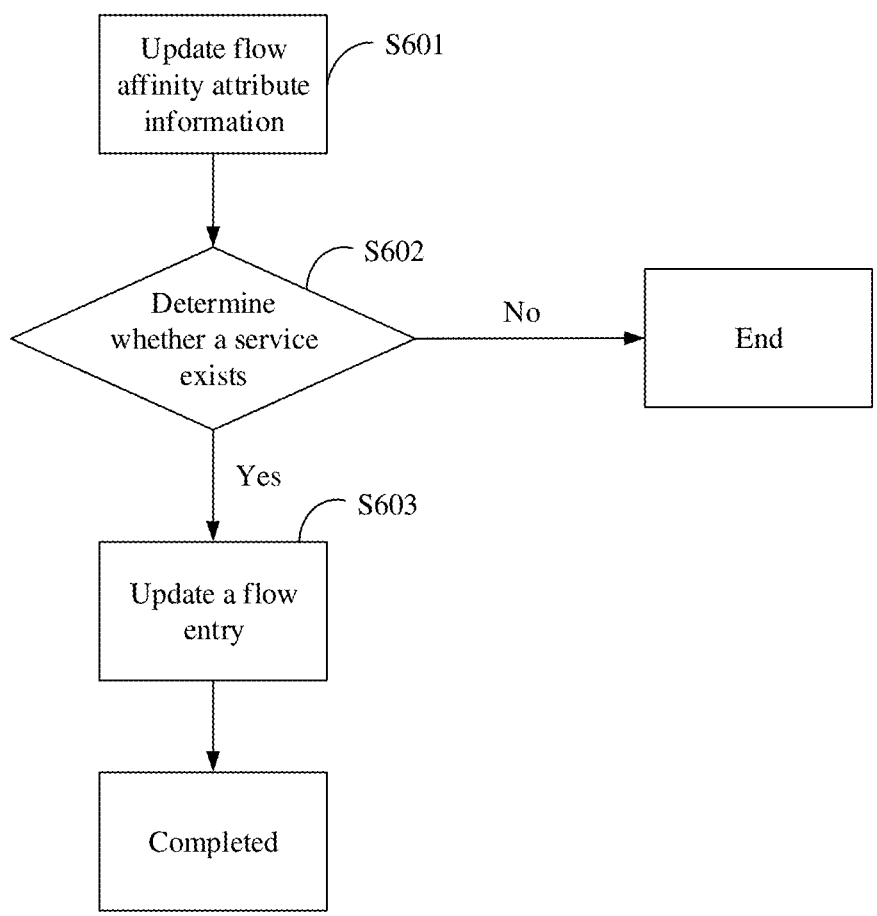
FIG. 6 is a schematic flowchart of updating a flow entry according to an embodiment of this application.

In a second manner, the flow entry is updated based on a notification message of a management node. Details are shown in FIG. 6.

S601: The network node receives a notification message from the management node or another network node, where the notification message includes indication information for updating flow affinity attribute information of a service.

S602: The network node queries a flow table to determine whether a flow entry of a service in which flow affinity attribute information is updated exists, and if the flow entry of the service in which flow affinity attribute information is updated exists, performs S603, or otherwise, performs S604.

S603: The network node updates a flow entry in the flow table.

A flow entry corresponding to the updated service is updated based on the notification message. For example, a flow affinity type is updated, or flow affinity timeout time is updated.

Figure 7:
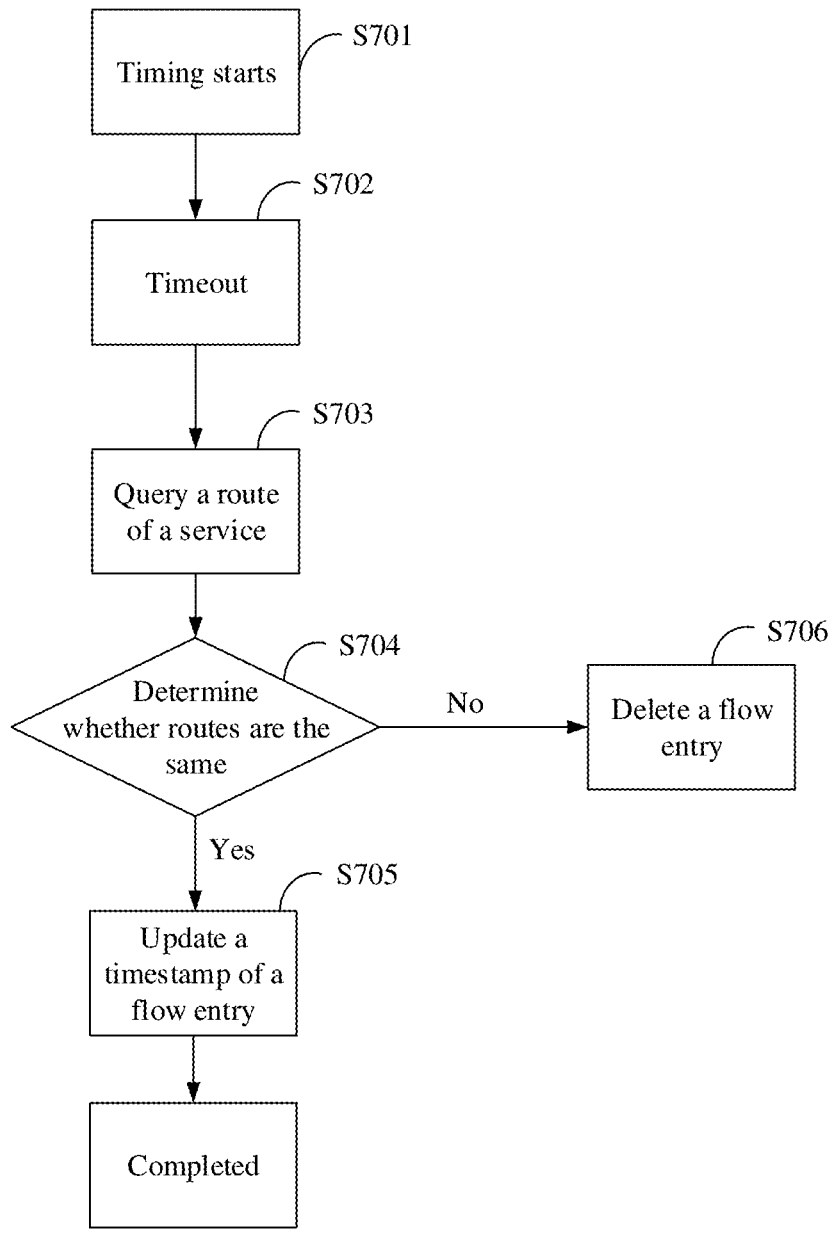
FIG. 7 is a schematic flowchart 1 of deleting a flow entry according to an embodiment of this application.

In a third manner, deletion of the flow entry is triggered when the flow affinity timeout time arrives. A specific process is shown in FIG. 7.

S701: The network node starts to time timing time.

When the 1$^{st}$ data packet in a data flow arrives or each time any data packet in a data flow arrives, the timing time is reset, for example, a timer is restarted.

S702: The network node determines that timing time in a flow entry exceeds flow affinity timeout time.

When the timing time in the flow entry exceeds the flow affinity timeout time, the network node may directly delete the flow entry, or may perform S703.

S703: Query a route of a service.

S704: Determine whether the found route of the service is the same as a route indicated by the flow entry, and if the routes are the same, perform S705, or otherwise, perform S706.

S705: Update a timestamp parameter in the flow entry without deleting the flow entry.

S706: Delete the flow entry.

Figure 8:
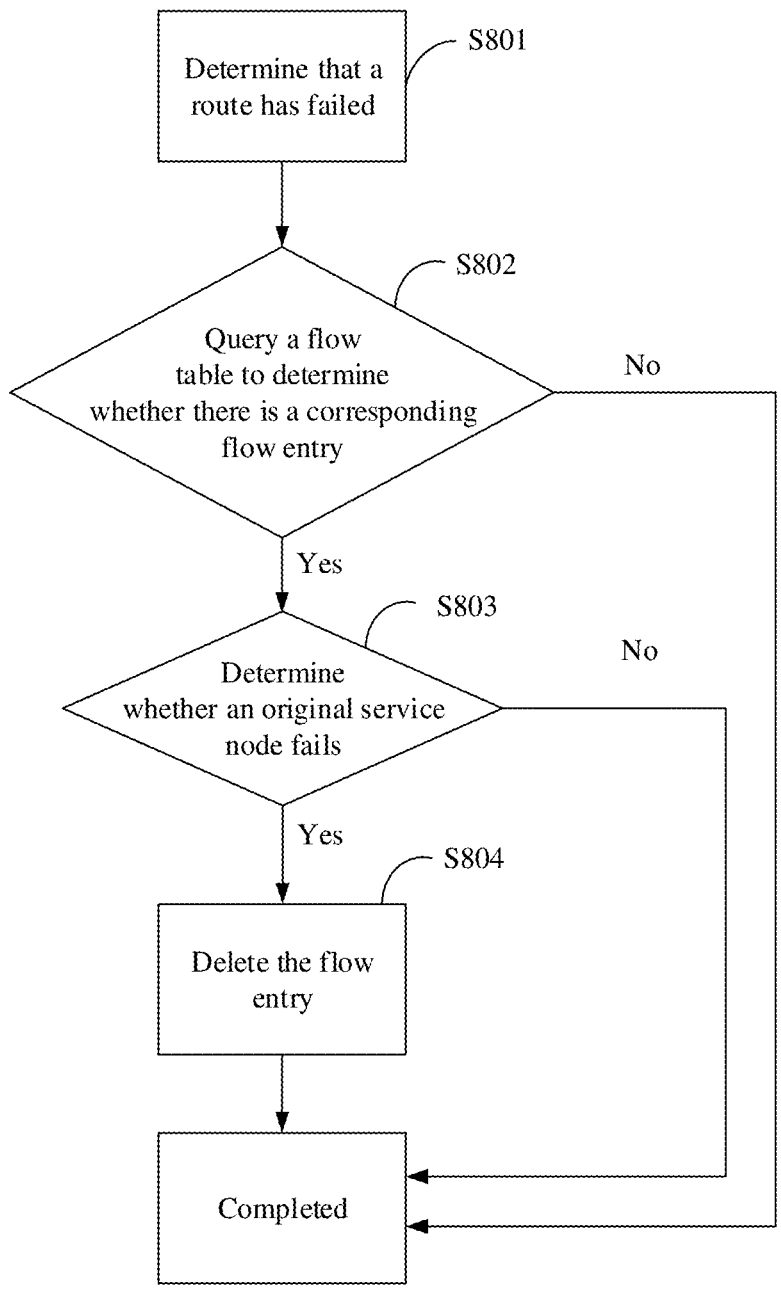
FIG. 8 is a schematic flowchart 2 of deleting a flow entry according to an embodiment of this application.

In a fourth manner, the network node deletes the flow entry if the network node determines that a route of the data flow has failed. A specific process is shown in FIG. 8.

S801: The network node determines that a route of a data flow has failed.

That the route fails means that the data flow cannot be forwarded to an original service node via the network node. For example, the network node may receive a route change/route failure notification message via another network node or a management node.

S802: The network node queries a flow table to determine whether there is a flow entry corresponding to a data flow whose route fails, and if there is the flow entry corresponding to the data flow whose route fails, performs S803, or otherwise, this procedure ends.

S803: The network node determines whether an original service node of the data flow fails or is unreachable, and if the original service node of the data flow fails or is unreachable, performs S804, or otherwise, this procedure ends.

S804: Delete a flow entry that is in the flow table and that is corresponding to the data flow whose route fails.

Maintenance of the flow table may be triggered by using the foregoing several methods.

Each time the network node receives a data packet, the network node may query, based on a locally stored or maintained flow table, a flow entry of a data flow to which the data packet belongs, and forward the data packet based on the flow entry, to maintain flow affinity.

Figure 9:
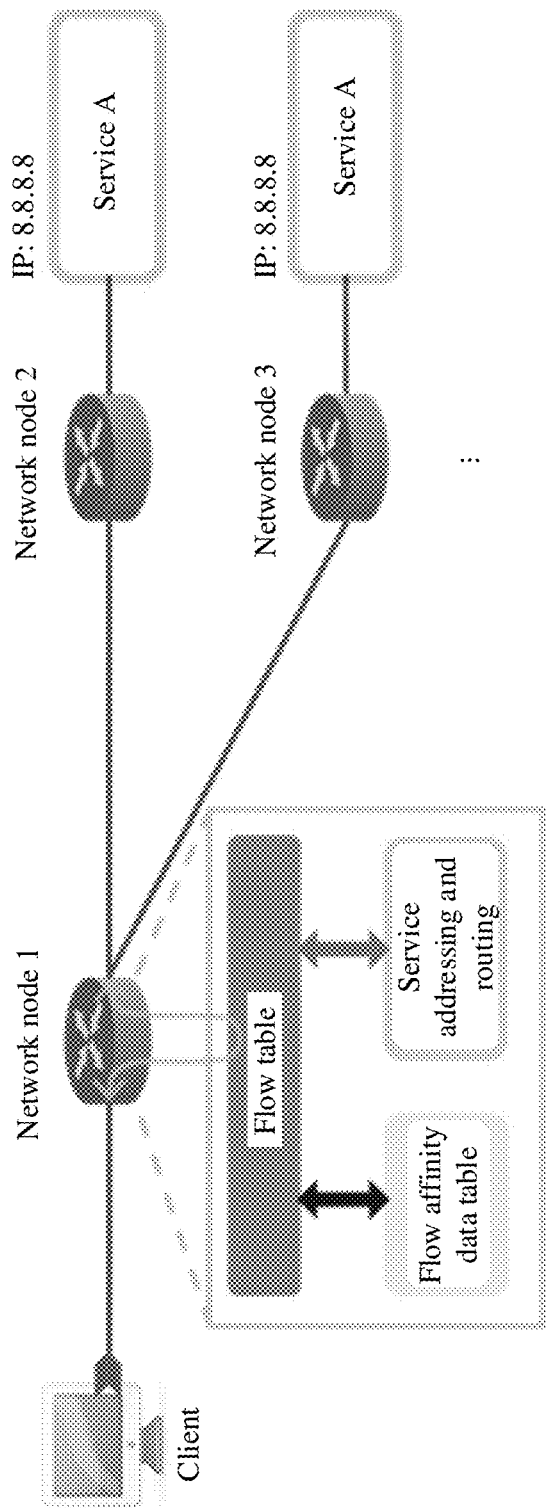
FIG. 9 is a schematic flowchart of a manner of maintaining flow affinity according to an embodiment of this application.
Figure 10:
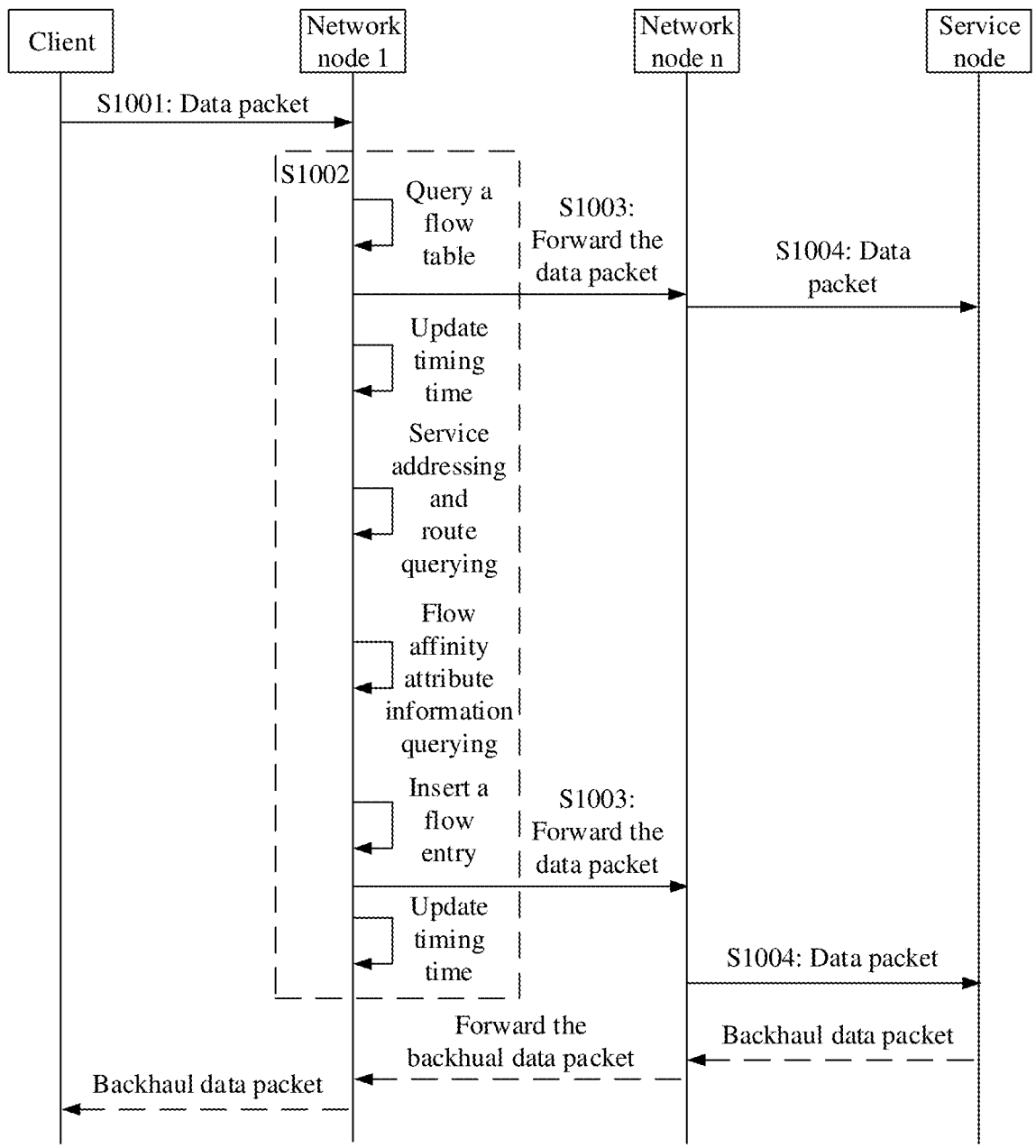
FIG. 10 is a schematic flowchart 2 of a network routing method according to an embodiment of this application.

As shown in FIG. 9, a manner of maintaining flow affinity is described in detail below by using a specific embodiment. It is assumed that a network includes a network node 1, a network node 2, a network node 3, a network node n, and the like, a client, and a service node. The client is to access a service, for example, a service A. An IP address of the service A is 8.8.8.8, and one or more service instances of one or more service nodes run the service A. The network node 1 is used as an execution body, and the network node 1 stores and maintains a flow table. The flow table includes a flow entry of each data flow that passes through the network node 1. The network node 1 may establish and maintain the flow table based on a flow affinity data table and a service addressing and routing result. As shown in FIG. 10, an entire network routing method is described below.

S1001: The client accesses the service A, a service request is transferred to the network node 1, and the network node 1 receives an access request of the client for the service A.

Specifically, after accessing the network, the client initiates a call request to the service A, and the request packet arrives at the network node 1. After completing addressing and route computing, the network node 1 establishes a flow entry in a flow table based on flow affinity attribute information that is of the service A and that is in a flow affinity data table, so that a subsequent data packet is forwarded based on the flow entry.

S1002: The network node 1 queries the flow table, and forwards a data packet of the access request based on the flow entry in the flow table, or establishes a flow entry.

Specifically, the network node 1 queries, based on an identifier (ID) that is of the service and that is in the data packet, whether a flow entry corresponding to the service and the client exists in a locally stored flow table. For example, an implementation of the identifier (ID) of the service is a service anycast IP address, and the service anycast IP address may be used as a destination IP address of the data packet to identify the ID of the service. If the flow entry corresponding to the service and the client exists, forwarding is performed based on a next-hop routing node indicated by the flow entry, and certainly, a corresponding operation is performed based on another parameter in the flow entry. If the flow entry corresponding to the service and the client does not exist, the flow affinity attribute information that is of the service and that is in the flow affinity data table is queried, a route of the service is queried, a flow entry is generated based on the flow affinity attribute information of the service and a result of the found route, and the flow entry is inserted into the flow table. When there is a flow entry of the flow in the flow table, information about timing time corresponding to the flow entry needs to be reset or updated, for example, a timer is restarted. When there is no flow entry of the flow in the flow table, information about the timing time is started, for example, a timer is started, when the flow entry is established.

When receiving, again, a data packet sent by the client, the network node 1 repeatedly performs the foregoing method.

It is assumed that the network node 1 forwards the data packet to a next-hop network node n.

S1003: The network node n queries the flow table, and forwards a data packet of the access request based on the flow entry in the flow table, or establishes a flow entry.

An action executed by the network node n is the same as an action executed by the network node 1. Refer to the description of S1002.

It is assumed that a next hop to which the network node 1 forwards the data packet is a service node.

S1004: The network node n sends the data packet to the service node, and the service node receives the data packet from the network node n.

After receiving the data packet, the service node performs a downstream transmission process. In other words, the data packet is backhauled to the client. A specific backhaul process is related to a flow entry established during upstream transmission. When receiving the data packet, each network node reversely forwards the data packet based on the flow entry established during upstream transmission.

In this way, an entire routing process of the data packet is completed, and flow affinity of the service is maintained.

Based on descriptions of the foregoing embodiments, the network routing method provided in the embodiments of this application is further described in detail by using an application scenario in MEC as an example.

Figure 11:
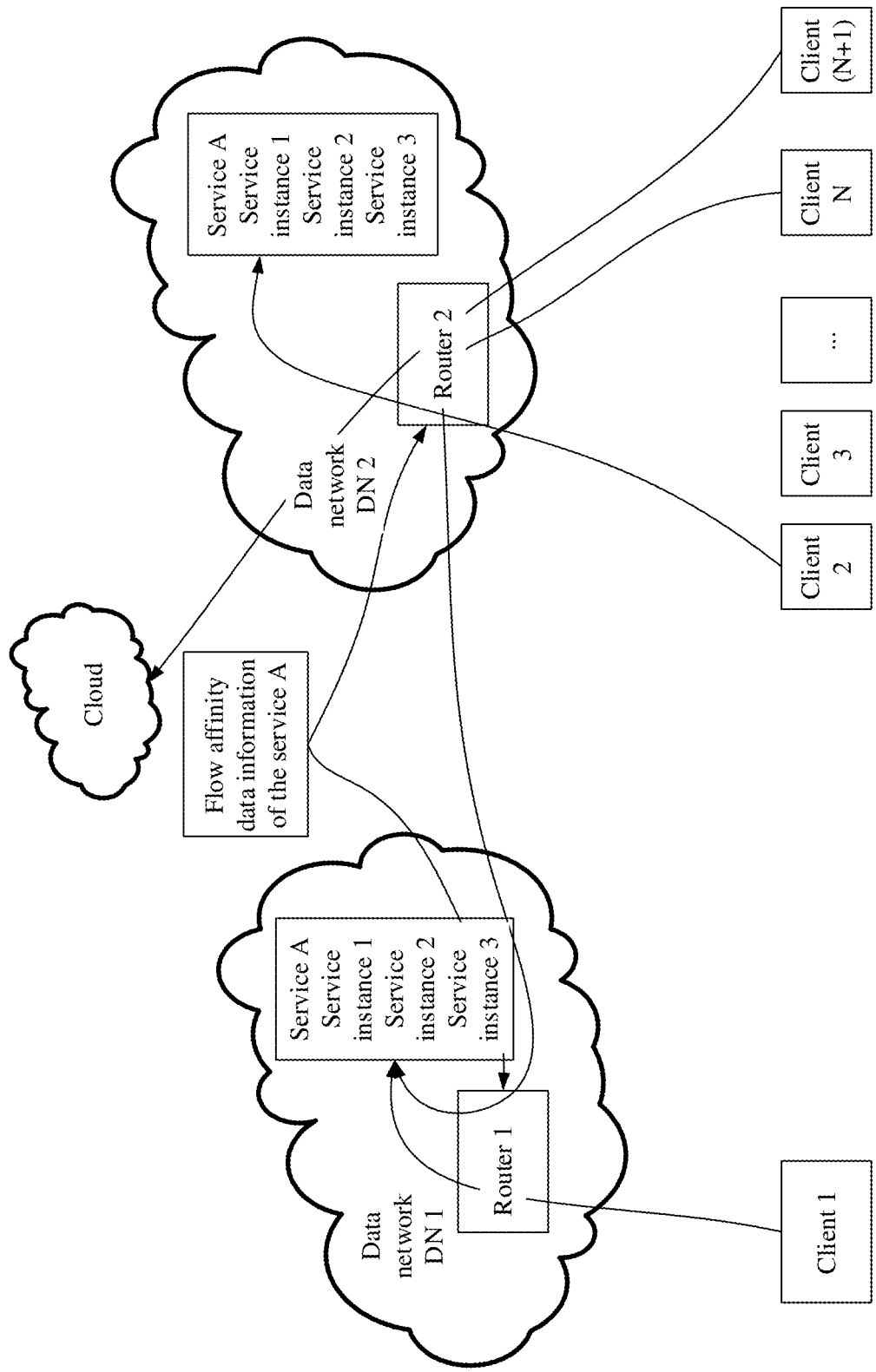
FIG. 11 is a schematic flowchart 3 of a network routing method according to an embodiment of this application.

As shown in FIG. 11, a service (service) A is deployed on each of two edge sites (MEC) of a same metropolitan area network, and the service A is provided externally. For example, the service A is live broadcasting of a virtual reality (virtual reality, VR) interactive service, and in addition, there is a computing resource on a remote cloud (cloud) site to provide the service A. The site is the service node in the foregoing descriptions. The service A on a same service node has a plurality of instances, and the plurality of instances use a same application programming interface (application programming interface, API) gateway (gateway), all API gateways of the service A expose a same IP address externally. A router (router) for computing scheduling is deployed at an entry of each service node, and the router is the network node in the foregoing descriptions. The management node notifies each service node of flow affinity attribute information of the service A, and each service node locally stores the flow affinity attribute information of the service A, for example, stores the flow affinity attribute information of the service A by using a flow affinity data table.

A corresponding forwarding policy may be configured on a user plane function (user plane function, UPF) of a network element device, so that a data packet that accesses the service A is directed to be forwarded to a nearby router.

Optionally, after accessing a network, the client initiates a call request to the service A, and arrives at the UPF via an access network device. The UPF forwards, in a directed manner to a nearby router according to the forwarding policy, a data packet that accesses the service A.

After the data packet arrives at the router, the router performs service addressing and route computing, and establishes a flow entry based on a service addressing and route computing result and the flow affinity attribute information. The router forwards a subsequent data packet based on the flow entry.

At the beginning of system running, there are plenty of service resources of the service A on each service node, and a nearby service node provides a service for the request of the client. As shown in FIG. 11, a client 1 establishes a connection to a service A on a service node 1, and a client 2 establishes a connection to a service A on a service node 2. As a system runs, load imbalance occurs between service nodes. For example, clients that perform access through a router 2 gradually increase, and load of the service A on the service node 2 becomes heavy, and this affects quality of service of some users. In this case, the router 2 schedules a newly accessing client N to the neighboring service node 1, and a newly accessing client (N+1) is scheduled to a higher cloud site.

There are a plurality of data flows passing through the router 2, and destination IP addresses of the data flows are the same and are all the service A. However, different data flows actually arrive at different service nodes. If a common routing and forwarding function in an existing technology is used, it cannot be ensured that a data packet of each data flow can be forwarded to an original service node, and a problem such as a flow disconnection or a packet loss may occur. According to the method in the foregoing design in the embodiments of this application, when receiving a data packet, the router 2 forwards the data packet based on a flow entry of a data flow to which the data packet belongs. This can help ensure flow affinity of each flow and ensure correct and efficient forwarding of each flow.

In conclusion, according to the network routing method provided in the embodiments of this application, the network node locally establishes the flow entry based on the flow affinity attribute information, and forwards the data packet based on the flow entry. This helps ensure correct and efficient forwarding of the data flow. Different services may expose flow affinity attribute information of the services to the network based on requirements of the services, and the network may spread the flow affinity attribute information based on the requirements of the services, to implement efficient matching and dynamic adjustment of the requirements of the services. In addition, based on the additional parameter in the flow affinity attribute information, various requirements of the client or the service for the flow affinity of the data flow can be implemented. When the service or the client has a real-time changing requirement for the flow affinity, the flow entry may alternatively be adjusted in real time, to meet requirements of various services for the flow affinity. The flow entry is continuously refreshed by using the timing time information in the flow entry, to maintain a dynamic feature of the service node of the data flow for the client. Through update or deletion of the flow entry, a more suitable service node can be matched for the client in time.

Figure 12:
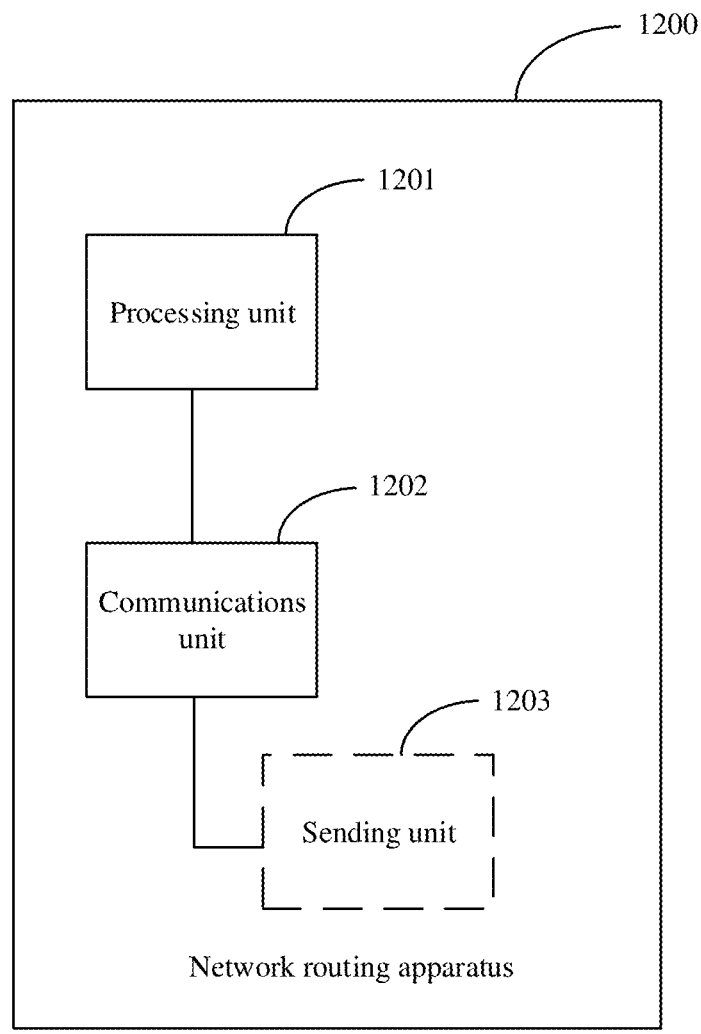
FIG. 12 is a schematic diagram 1 of a structure of a network routing apparatus according to an embodiment of this application.

Based on a same concept of the foregoing method embodiment, as shown in FIG. 12, an embodiment of this application further provides a network routing apparatus 1200. The network routing apparatus 1200 has a function of performing operations performed by the network node in the foregoing method embodiment. The function may be implemented by hardware, or may be implemented by hardware executing corresponding software. The hardware or the software includes one or more modules corresponding to the foregoing function. For example, the network routing apparatus 1200 includes a processing unit 1201 and a receiving unit 1202. The receiving unit 1202 is configured to perform a receiving step in the method embodiment. The processing unit 1201 is configured to perform a step other than the receiving step. The network routing apparatus 1200 may be a network node, a router, or a switch, or may be a chip or a function module in the network node, the router, or the switch.

When the network routing apparatus 1200 is configured to perform the operations performed by the network node in the foregoing method embodiment, the receiving unit 1202 is configured to receive a first data packet from a client, where the first data packet includes an identifier of a service;

the processing unit 1201 is configured to obtain flow affinity attribute information of the service based on the identifier of the service, where the flow affinity attribute information of the service includes a flow affinity type of the service and flow affinity timeout time of the service, and the flow affinity type is used to identify one or more data items in the first data packet as key values to identify a data flow to which the first data packet belongs; and the processing unit 1201 is further configured to establish a flow entry based on the flow affinity attribute information of the service when the first data packet is the $1^{st}$ data packet in the data flow, where the flow entry is used to forward a subsequent data packet in the data flow.

Optionally, the processing unit 1201 is further configured to:

determine, based on the identifier of the service, information about a next-hop network node to which the first data packet is routed, where the flow entry further includes the information about the next-hop network node.

Optionally, the receiving unit 1202 is configured to receive a second data packet from the client, where the second data packet includes the identifier of the service.

The processing unit 1201 is further configured to: obtain the flow affinity attribute information of the service based on the identifier of the service; determine one or more flow tables corresponding to the flow affinity type of the service, where there is a correspondence between the flow affinity type of the service and the one or more flow tables; and forward the second data packet based on the flow entry if it is determined that the one or more flow tables include the flow entry corresponding to the data flow.

Optionally, the processing unit 1201 is further configured to:

determine one or more flow tables corresponding to the flow affinity type of the service, where there is a correspondence between the flow affinity type of the service and the one or more flow tables; and if it is determined that the one or more flow tables do not include the flow entry corresponding to the data flow, determine that the first data packet is the Pt data packet in the data flow.

Optionally, the network routing apparatus 1200 further includes a sending unit 1203, and the sending unit 1203 is configured to send a query message to a management node, where the query message is used to query the flow affinity attribute information of the service.

The receiving unit 1202 is further configured to receive an acknowledgement message of the query message from the management node, where the acknowledgement message carries the flow affinity attribute information of the service.

Optionally, the processing unit 1201 is further configured to:

delete the flow entry if it is determined that timing time in the flow entry exceeds the flow affinity timeout time.

Optionally, the processing unit 1201 is further configured to:

delete the flow entry if it is determined that a route of the data flow has failed.

Optionally, the flow entry further includes one or more of the following information: the identifier of the service, a source internet protocol (IP) address, a source port, a destination IP address, a destination port, and the information about the next-hop network node.

Optionally, a value of the flow affinity type includes one of or any combination of the following: a transmission protocol type, the source IP address, the source port, the destination IP address, and the destination port.

Optionally, the flow affinity attribute information of the service further includes one or more of the following: indication information indicating whether an upstream transmission path and a downstream transmission path of the data flow need to be consistent; hot swapping function indication information of the data flow, where the hot swapping function indication information of the data flow includes enable indication information; backhaul packet timeout timer time information; data flow caching function indication information; data flow caching cache length information; data flow resetting indication information, where the resetting indication information is used for indicating whether the network node monitors a first flag bit of the data packet, reselecting, based on a monitoring result, a service node that receives the data flow, and updating the flow entry; and data flow deletion indication information, where the deletion indication information is used for indicating whether the network node monitors a second flag bit of the data packet, and deleting the flow entry of the data flow based on a monitoring result.

Figure 13:
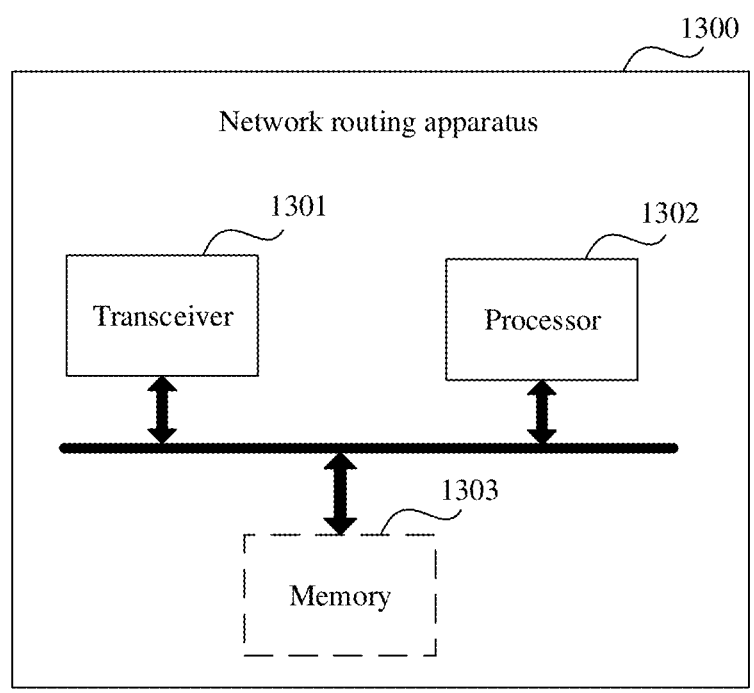
FIG. 13 is a schematic diagram 2 of a structure of a network routing apparatus according to an embodiment of this application.

Based on a same concept of the foregoing method embodiment, as shown in FIG. 13, an embodiment of this application further provides a network routing apparatus 1300. The network routing apparatus 1300 is configured to perform operations performed by the network node in the foregoing method embodiment. FIG. 13 shows only main components of the network routing apparatus 1300.

The network routing apparatus 1300 includes a transceiver 1301 and a processor 1302, and optionally, may further include a memory 1303. The transceiver 1301 is configured to perform message or signaling transmission with another device (for example, a client or a service node). The processor 1302 is coupled to the memory 1303 and is configured to invoke a program in the memory 1303, so that when the program is executed, the processor 1302 performs the operations performed by the network node in the foregoing method embodiment. The memory 1303 is configured to store the program executed by the processor 1302. The transceiver 1301 may include a transmitter and/or a receiver, to separately implement a transmitting function and a receiving function. There may be one or more processors 1302. The memory 1303 may be located in the processor 1302, or may exist separately. The functional module, namely, the processing unit 1201 in FIG. 12 may be implemented by using the processor 1302, and the receiving unit 1202 and the sending unit 1203 may be implemented by using the transceiver 1301. A person skilled in the art may understand that, for ease of description, FIG. 13 shows only one memory and one processor. There may be a plurality of processors and a plurality of memories on an actual network node. The memory may also be referred to as a storage medium, a storage device, or the like. This is not limited in the embodiments of this application.

The processor 1302 is mainly configured to: process a communications protocol and communication data, control the entire network routing apparatus, execute a software program, and process data of the software program, for example, configured to support the network routing apparatus in performing the actions described in the foregoing method embodiments. The memory 1303 is mainly configured to store a software program and data.

the transceiver 1301 is configured to receive a first data packet from a client, where the first data packet includes an identifier of a service;

the processor 1302 is configured to obtain flow affinity attribute information of the service based on the identifier of the service, where the flow affinity attribute information of the service includes a flow affinity type of the service and flow affinity timeout time of the service, and the flow affinity type is used to identify one or more data items in the first data packet as key values to identify a data flow to which the first data packet belongs; and the processor 1302 is further configured to establish a flow entry based on the flow affinity attribute information of the service when the first data packet is the $1^{st}$ data packet in the data flow, where the flow entry is used to forward a subsequent data packet in the data flow.

Optionally, the processor 1302 is further configured to:
determine, based on the identifier of the service, information about a next-hop network node to which the first data packet is routed, where the flow entry further includes the information about the next-hop network node.

Optionally, the transceiver 1301 is further configured to receive a second data packet from the client, where the second data packet includes the identifier of the service.

The processor 1302 is further configured to: obtain the flow affinity attribute information of the service based on the identifier of the service; determine one or more flow tables corresponding to the flow affinity type of the service, where there is a correspondence between the flow affinity type of the service and the one or more flow tables; and forward the second data packet based on the flow entry if it is determined that the one or more flow tables include the flow entry corresponding to the data flow.

Optionally, the processor 1302 is further configured to:
determine one or more flow tables corresponding to the flow affinity type of the service, where there is a correspondence between the flow affinity type of the service and the one or more flow tables; and
if it is determined that the one or more flow tables do not include the flow entry corresponding to the data flow, determine that the first data packet is the $1^{st}$ data packet in the data flow.

Optionally, the transceiver 1301 is further configured to:
send a query message to a management node, where the query message is used to query the flow affinity attribute information of the service; and
receive an acknowledgement message of the query message from the management node, where the acknowledgement message carries the flow affinity attribute information of the service.

Optionally, the processor 1302 is further configured to:
delete the flow entry if it is determined that timing time in the flow entry exceeds the flow affinity timeout time.

Optionally, the processor 1302 is further configured to:
delete the flow entry if it is determined that a route of the data flow has failed.

Optionally, the flow entry further includes one or more of the following information: the identifier of the service, a source internet protocol (IP) address, a source port, a destination IP address, a destination port, and the information about the next-hop network node.

Optionally, a value of the flow affinity type includes one of or any combination of the following: a transmission protocol type, the source IP address, the source port, the destination IP address, and the destination port.

Optionally, the flow affinity attribute information of the service further includes one or more of the following: indication information indicating whether an upstream transmission path and a downstream transmission path of the data flow need to be consistent; hot swapping function indication information of the data flow, where the hot swapping function indication information of the data flow includes enable indication information; backhaul packet timeout timer time information; data flow caching function indication information; data flow caching cache length information; data flow resetting indication information, where the resetting indication information is used for indicating whether the network node monitors a first flag bit of the data packet, reselecting, based on a monitoring result, a service node that receives the data flow, and updating the flow entry; and data flow deletion indication information, where the deletion indication information is used for indicating whether the network node monitors a second flag bit of the data packet, and deleting the flow entry of the data flow based on a monitoring result.

The processor 1302 may be a central processing unit (central processing unit, CPU), a network processor (network processor, NP), or a combination of the CPU and the NP.

The processor 1302 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable logic gate array (field programmable gate array, FPGA), a generic array logic (generic array logic, GAL), or any combination thereof.

The memory 1303 may include a volatile memory (volatile memory), for example, a random access memory (random access memory, RAM). The memory 1303 may further include a non-volatile memory (non-volatile memory), for example, a flash memory (flash memory), a hard disk drive (hard disk drive, HDD), or a solid-state drive (solid-state drive, SSD). The memory 1303 may further include a combination of the foregoing types of memories.

A part or all of operations and functions performed by the network node described in the foregoing method embodiments of this application may be completed by using a chip or an integrated circuit.

To implement functions of the network routing apparatus described in FIG. 12 or FIG. 13, an embodiment of this application further provides a chip, including a processor, configured to support the network routing apparatus in implementing the functions related to the network node in the foregoing method embodiments. In a possible design, the chip is connected to a memory or the chip includes a memory, and the memory is configured to store a program instructions and data that are necessary for the network routing apparatus.

An embodiment of this application provides a computer storage medium that stores a computer program. The computer program includes instructions used to perform the foregoing method embodiments.

An embodiment of this application provides a computer program product including instructions. When the computer program product is run on a computer, the computer is enabled to perform the foregoing method embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although example embodiments of this application are described, persons skilled in the art can make changes and modifications to the embodiments once they learn the basic inventive concept. Therefore, the following claims are intended to be construed as to cover the example embodiments and all changes and modifications falling within the scope of this application.

It is clear that, persons skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:
1. A method, comprising:
receiving, by a network node, a first data packet from a client, wherein the first data packet comprises an identifier of a service;
obtaining, by the network node, flow affinity attribute information of the service based on the identifier of the service, wherein the flow affinity attribute information of the service comprises a flow affinity type of the service, a flow affinity timeout time of the service, and hot swapping function indication information of the data flow, wherein the hot swapping function indication information of the data flow comprises enable indication information; and establishing, by the network node, a flow entry based on the flow affinity attribute information of the service in response to the first data packet being a $1^{st}$ data packet in a data flow, wherein the flow entry is useable to forward a subsequent data packet in the data flow.

2. The method according to claim 1, wherein the method further comprises:

determining, by the network node, information about a next-hop network node to which the first data packet is routed based on the identifier of the service, wherein the flow entry comprises the information about the next-hop network node.

3. The method according to claim 1, wherein the method further comprises:

receiving, by the network node, a second data packet from the client, wherein the second data packet comprises the identifier of the service;

obtaining, by the network node, the flow affinity attribute information of the service based on the identifier of the service;

determining, by the network node, one or more flow tables corresponding to the flow affinity type of the service; and forwarding, by the network node, the second data packet based on the flow entry in response to the network node determining that the one or more flow tables comprise the flow entry corresponding to the data flow.

4. The method according to claim 1, wherein the method further comprises:

determining, by the network node, one or more flow tables corresponding to the flow affinity type of the service; and determining, by the network node, that the first data packet is the $1^{st}$ data packet in the data flow in response to the network node determining that the one or more flow tables do not comprise the flow entry corresponding to the data flow.

5. The method according to claim 1, wherein the method further comprises:

sending, by the network node, a query message to a management node, wherein the query message is useable to query the flow affinity attribute information of the service; and receiving, by the network node, an acknowledgement message of the query message from the management node, wherein the acknowledgement message includes the flow affinity attribute information of the service.

6. The method according to claim 1, wherein the method further comprises:

deleting, by the network node, the flow entry in response to the network device determining that a timing in the flow entry exceeds the flow affinity timeout time.

7. The method according to claim 1, wherein the method further comprises:

deleting, by the network node, the flow entry in response to the network node determining that a route of the data flow has failed.

8. The method according to claim 1, wherein the flow entry comprises at least one of:

the identifier of the service, a source internet protocol (IP) address, a source port, a destination IP address, a destination port or information about a next-hop network node.

9. The method according to claim 1, wherein a value of the flow affinity type comprises at least one of:

a transmission protocol type, a source internet protocol (IP) address, a source port, a destination IP address, or a destination port.

10. The method according to claim 1, wherein the flow affinity attribute information of the service further comprises at least one of:

indication information indicating whether an upstream transmission path and a downstream transmission path of the data flow are consistent with each other;

backhaul packet timeout timer time information;

data flow caching function indication information;

data flow caching cache length information;

data flow resetting indication information, wherein the data flow resetting indication information is useable for indicating whether the network node monitors a first flag bit of the data packet, reselecting, based on a monitoring result of the first flag bit, a service node that receives the data flow, and updating the flow entry; or data flow deletion indication information, wherein the data flow deletion indication information is useable for indicating whether the network node monitors a second flag bit of the data packet, and deleting the flow entry of the data flow based on a monitoring result of the second flag bit.

11. A network routing apparatus, comprising:

one or more processors; and a non-transitory computer-readable memory configured to store non-transitory instructions, and the one or more processors are configured to execute the non-transitory instructions thereby causing the network routing apparatus to:

receive a first data packet from a client, wherein the first data packet comprises an identifier of a service;

obtain flow affinity attribute information of the service based on the identifier of the service, wherein the flow affinity attribute information of the service comprises a flow affinity type of the service, a flow affinity timeout time of the service, and hot swapping function indication information of the data flow, wherein the hot swapping function indication information of the data flow comprises enable indication information, and the flow affinity type is useable to identify one or more data items in the first data packet as key values to thereby identify a data flow to which the first data packet belongs; and establish a flow entry based on the flow affinity attribute information of the service in response to the first data packet being a $1^{st}$ data packet in the data flow, wherein the flow entry is useable to forward a subsequent data packet in the data flow.

12. The apparatus according to claim 11, wherein the one or more processors is further configured to execute the non-transitory instructions thereby causing the network routing apparatus to:

determine, based on the identifier of the service, information about a next-hop network node to which the first data packet is routed, wherein the flow entry comprises the information about the next-hop network node.

13. The apparatus according to claim 11, wherein the one or more processors is further configured to execute the non-transitory instructions thereby causing the network routing apparatus to:
- receive a second data packet from the client, wherein the second data packet comprises the identifier of the service; and
- obtain the flow affinity attribute information of the service based on the identifier of the service;
- determine one or more flow tables corresponding to the flow affinity type of the service; and
- forward the second data packet based on the flow entry in response to determining that the one or more flow tables comprise the flow entry corresponding to the data flow.

14. The apparatus according to claim 11, wherein the one or more processors is further configured to execute the non-transitory instructions thereby causing the network routing apparatus to:
- determine one or more flow tables corresponding to the flow affinity type of the service; and
- determine that the first data packet is the $1^{st}$ data packet in the data flow in response to determining that the one or more flow tables do not comprise the flow entry corresponding to the data flow.

15. The apparatus according to claim 11, wherein the one or more processors is further configured to execute the non-transitory instructions thereby causing the network routing apparatus to:
- send a query message to a management node, wherein the query message is useable to query the flow affinity attribute information of the service; and
- receive an acknowledgement message of the query message from the management node, wherein the acknowledgement message includes the flow affinity attribute information of the service.

16. The apparatus according to claim 11, wherein the one or more processors is further configured to execute the non-transitory instructions thereby causing the network routing apparatus to:
- delete the flow entry if it is determined that timing time in the flow entry exceeds the flow affinity timeout time.

17. The apparatus according to claim 11, wherein the one or more processors is further configured to execute the non-transitory instructions thereby causing the network routing apparatus to:
- delete the flow entry in response to determining that a route of the data flow has failed.

18. The apparatus according to claim 11, wherein the flow entry comprises at least one of:
- the identifier of the service, a source internet protocol (IP) address, a source port, a destination IP address, a destination port or information about a next-hop network node.

19. The apparatus according to claim 11, wherein a value of the flow affinity type comprises at least one of:
- a transmission protocol type, a source internet protocol (IP) address, a source port, a destination IP address, or a destination port.

20. The apparatus according to claim 11, wherein the flow affinity attribute information of the service further comprises at least one of:
- indication information indicating whether an upstream transmission path and a downstream transmission path of the data flow are consistent with each other;
- backhaul packet timeout timer time information;
- data flow caching function indication information;
- data flow caching cache length information;
- data flow resetting indication information, wherein the data flow resetting indication information is useable for indicating whether the network node monitors a first flag bit of the data packet, reselecting, based on a monitoring result of the first flag bit, a service node that receives the data flow, and updating the flow entry; or
- data flow deletion indication information, wherein the data flow deletion indication information is useable for indicating whether the network node monitors a second flag bit of the data packet, and deleting the flow entry of the data flow based on a monitoring result of the second flag bit.

* * * * *